Figure 1:
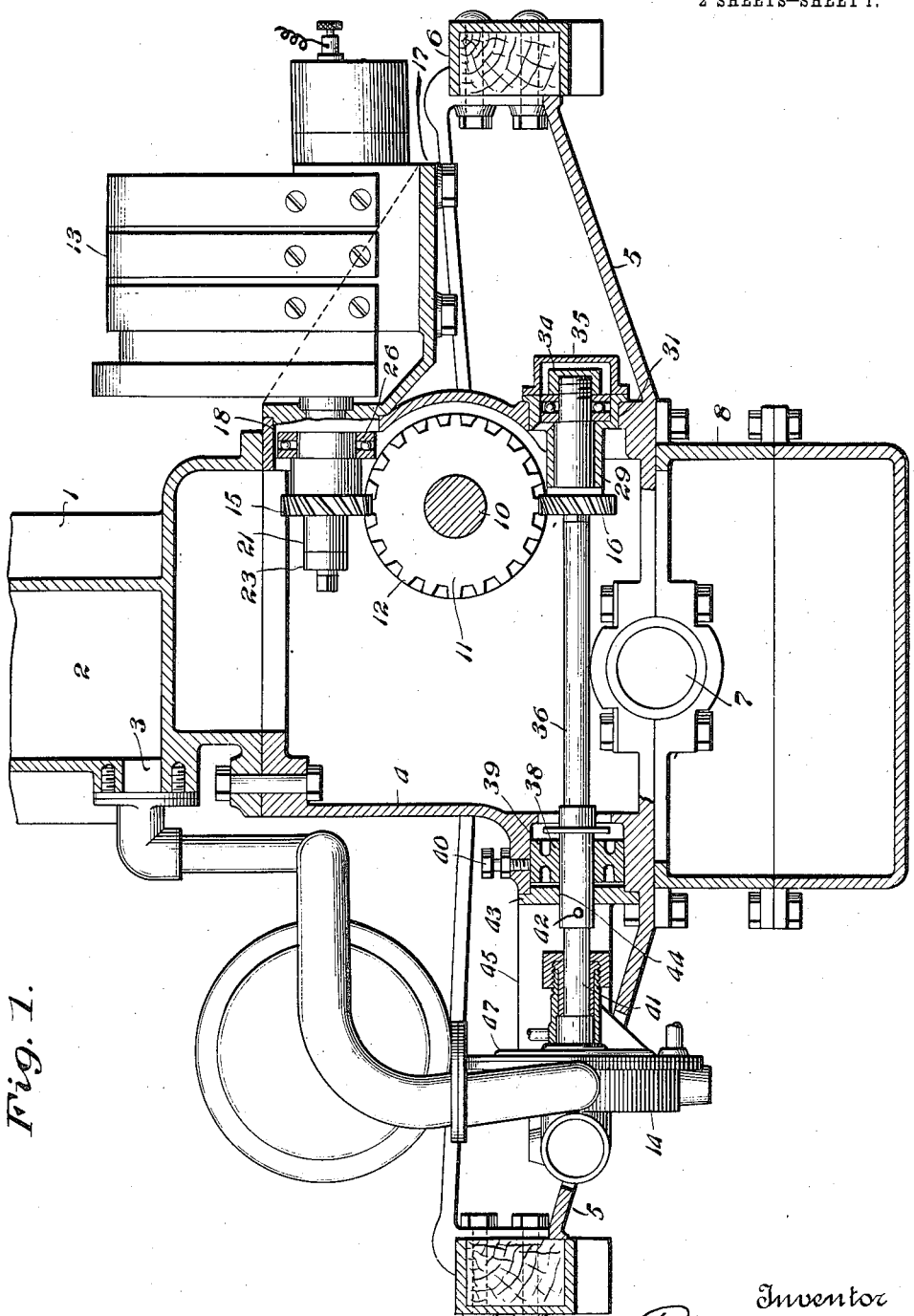

R. HUFF.
HYDROCARBON MOTOR.
APPLICATION FILED DEC. 22, 1910.

1,080,762.

Patented Dec. 9, 1913.

2 SHEETS—SHEET 1.

Witnesses
J. Adolph Bishop
John Andonegay.

Inventor
Russell Huff
By Foster Freeman Watson Coit
Attorneys

R. HUFF.
HYDROCARBON MOTOR.
APPLICATION FILED DEC. 22, 1910.
1,080,762.
Patented Dec. 9, 1913.
2 SHEETS—SHEET 2.
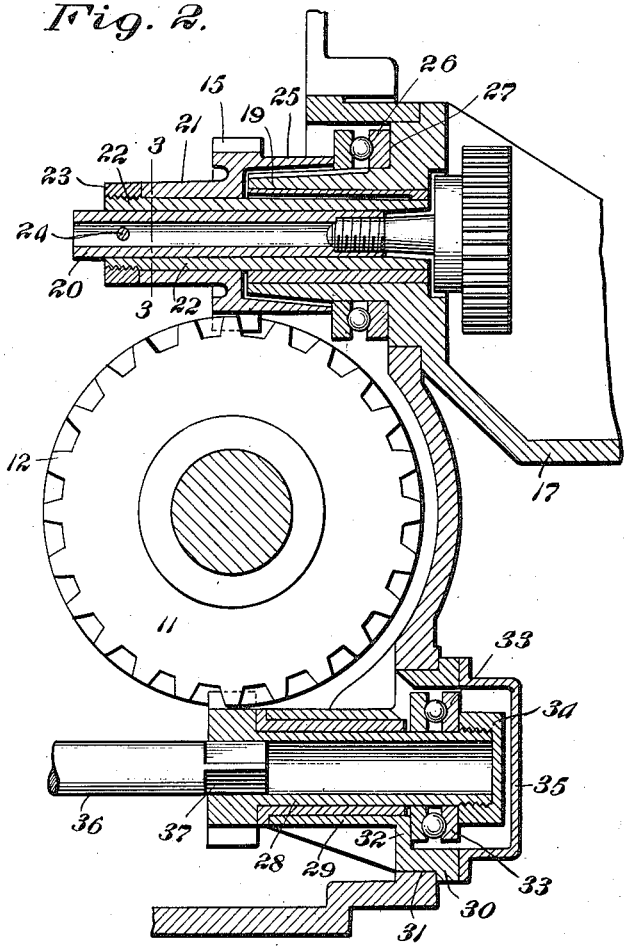
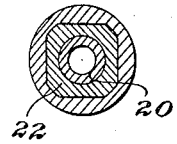

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

HYDROCARBON-MOTOR.

1,080,762.

Specification of Letters Patent.

Patented Dec. 9, 1913.

Original application filed March 20, 1909, Serial No. 484,833. Divided and this application filed December 22, 1910. Serial No. 598,853.

*To all whom it may concern:*

Be it known that I, RUSSELL HUFF, a citizen of the United States, and resident of Detroit, in the county of Wayne and State of Michigan, have invented certain new and useful Improvements in Hydrocarbon-Motors, of which the following is a specification.

The present application is a division of my application filed March 20, 1909, Serial No. 484,833, for Letters-Patent for improvements in hydrocarbon motors.

This invention relates to motors for motor vehicles, and particularly to the construction and arrangement of the shafts for driving the pump and magneto in such motors.

The primary object of the invention is the provision of a construction for taking up the end thrust of the magneto and pump shafts whereby displacement of the armature and pump piston will be prevented.

The nature, characteristic features and scope of the invention will be more fully understood from the following description taken in connection with the accompanying drawings forming a part thereof, in which:

Figure 1 is a part sectional view on a transverse plane between two cylinders of a motor vehicle embodying my invention, showing the water jacket in section; Fig. 2 is an enlarged sectional view of the driving gear on the valve shaft and the connected driven shafts and bearings; and Fig. 3 is a section taken on the line 3—3 of Fig. 2.

Referring to the drawings: 1 represents one of the cylinders of a multi-cylinder motor in which the water jacket 2 is common to all cylinders. The water inlet to the jacket is shown at 3. The cylinders 1 are bolted to the top of the supporting section 4 of the crank case, which section has laterally extending arms 5 with ends resting on and bolted to the side members of the vehicle frame 6. The crank shaft bearings 7 are shown suspended between the section 4 and the intermediate section 8 of the crank case, the crank shaft, connecting rods and piston being omitted for clearness. The bottom of the crank case is closed by the cover 9 which forms an oil well for splash lubrication.

Mounted in suitable bearings in the supporting section 4 is a valve operating shaft 10 which is geared by two-to-one gears to the crank shaft in the usual manner. By this means the valve shaft is driven by the crank shaft at one-half the speed thereof, whereby the valves are operated as in the usual four-stroke cycle motor. The shaft 10 is parallel to the crank shaft and is located at one side of the crank case. The gear 11 has on its surface the spiral teeth 12 which are adapted to engage similar spiral teeth on the transversely arranged gears for operating the magneto 13 and pump 14. The gear 15 for the magneto is of such size and the parts are so proportioned that the shaft of the magneto will be driven at twice the speed of the shaft 10 and thus at the same speed as the crank shaft. The gear 16 for driving the pump is preferably made smaller than the gear 15 so that the shaft of the pump will be driven at a greater speed than the magneto shaft and crank shaft, in order to create a proper circulation of water around the cylinders.

The magneto is supported on a bracket 17 which is suitably secured to the supporting section 4 of the crank case and in alinement with an opening 18 formed in the crank case. The bracket is provided with an extended sleeve 19 projecting within the opening 18 and constituting a bearing surrounding the shaft 20 of the magneto. The gear 15 is formed integral with or secured to a short shaft 21 having the bearing sleeve 22 extending within the sleeve 19 and between it and the shaft 20, this sleeve 22 having the outer squared end fitting within the shaft 21 so as to rotate therewith, and having a screw-threaded end adapted to receive a nut 23 for holding the parts together. The sleeve 22 is secured to the shaft 20 by any suitable means such as the pin 24. The shaft 21 has an annular flange 25 surrounding the sleeve 19 and engaging the thrust bearing 26 which is placed against a shoulder 27 on the bracket 17. By this means the end thrust caused by the engagement of the spiral teeth on the gears 11 and 15 is taken up by the bracket 17 through the thrust bearing 26, and is not transmitted to the magneto. The magneto furthermore being carried on the horizontal platform of the bracket 17 has a fixed and definite relation to the bearing formed in the sleeve 19 of the bracket, and therefore the parts may be so adjusted that the shaft of the magneto will accurately fit in the bearing and it is not necessary to have adjustable means for coupling the shaft of the magneto to the shaft which drives it. The driving connection to the shaft of the magneto being made through the squared end of the sleeve 22 permits longitudinal adjustment of the magneto to proper position and there is no thrust on this connection.

The gear 16 for driving the pump is formed with or carried by a short shaft 28 which is mounted to turn in an elongated sleeve 29 of a bracket 30, which bracket is placed in an opening 31 in the supporting section 4 of the crank case, and is secured to that case by any suitable means such as bolts. The sleeve 29 is formed with a shoulder 32, facing outwardly near its end, and a thrust bearing 33 fits against this shoulder and is engaged on the outer side by a cap 34 carried by the outer end of the shaft 28, and thus the end thrust of the shaft 28 caused by the engagement of the inclined or spiral teeth on the gears 11 and 16 is taken up by the bracket 30 through the thrust bearings 33. A cap or cover 35 is placed over the exposed outer end of the shaft 28 and the thrust bearing. Connection between the pump 14 and shaft 28 is established by means of a shaft 36 having a non-cylindrical portion 37 fitting within a similarly shaped socket in the end of the shaft 28, thus forming a slidable driving connection which is sufficiently loose to permit the shaft 36 to bend slightly in relation to the shaft 28, thus furnishing a practical and universal joint between the parts. The opposite end of the shaft 36 is mounted in a bearing 38. The shaft 41 of the pump fits in a socket formed in the end of the shaft 36 and the parts are secured so that they will rotate together by any suitable means, such as a pin 42.

From Fig. 2 it will be observed that the bracket 17, the gear 15, and the parts connecting the gear with the magneto are removable from the crank case without disassembling. It will also be observed that the bracket 30 together with the shaft 28, the gear 16, and the bearing 33 are removable from the crank case without disassembling. This feature is of especial advantage because it permits the parts to be adjusted before they are placed in position on the motor.

Having thus described the invention, what is claimed is:

1. In a motor, the combination with the crank case, of a spiral driving gear therein, brackets secured to said case, parallel shafts mounted to turn in said brackets, spiral gears on said shafts engaging said first mentioned gear, and end thrust bearings for said shafts engaging said brackets, said shafts and bearings being removable from the crank case with said brackets.

2. In a motor, the combination with the crank case, of a spiral driving gear therein, a removable bracket having an elongated sleeve secured in an opening in the wall of said gear case, a shaft in said sleeve, an end thrust bearing between said shaft and bracket, and a spiral gear on said shaft engaging said first mentioned gear, said bracket, the shaft with the gear thereon, and the thrust bearing being removable from the crank case while assembled.

3. In a motor, the combination with a driving shaft having a spiral gear thereon, of a wall adjacent said gear and provided with openings, elongated parallel bearing sleeves carried by said wall in said openings and at the periphery of said gear and on opposite sides thereof, short transverse shafts mounted in said sleeves, gears on said shafts meshing with said first mentioned gear, thrust bearings between said transverse shafts and sleeves, and means at the end of said transverse shafts for making longitudinal sliding connection with alined shafts, said shafts and gears being removable with said sleeves through said openings.

4. In a motor, the combination with a driving shaft having a spiral gear thereon, of a wall adjacent said gear and provided with openings, elongated parallel bearing sleeves carried by said wall in said openings and at the periphery of said gear and on opposite sides thereof, short transverse shafts mounted in said sleeves, gears on said shafts meshing with said first mentioned gear, and thrust bearings between said transverse shafts and sleeves, the said transverse shafts being provided with noncylindrical end sockets at their inner ends and removable with their gears and sleeves through said openings.

5. In a motor, the combination with a driving shaft at one side thereof, of a transverse driven shaft, gear connections between said shafts producing end thrust, a thrust bearing for said driven shaft, a shaft extending to the opposite side of the motor in line with said transverse shaft, and end driving connection between said last mentioned shafts permitting slight universal movement and slight relative longitudinal movement.

6. In a motor, the combination with a driving shaft at one side thereof, of a transverse driven shaft, gear connections between said shafts producing end thrust, a thrust bearing for said driven shaft, a shaft extending to the opposite side of the motor in line with said transverse shaft, one of said shafts being provided with an end socket angular in cross section and the other being provided with a short end portion formed to slidably fit in said socket, thus furnishing a universal joint.

7. In a motor, the combination with the side supports, of a short transverse shaft on one side between the supports, bearings for maintaining said shaft in position, means for driving said shaft, an auxiliary device on the opposite side, an elongated driving shaft for said device extending across the motor in line with the short shaft, and a driving connection between the ends of said shafts permitting slight relative movement in any direction.

8. In a motor, the combination with the gear case, and side supports therefor, of a short transverse shaft mounted in one side of the case between the supports, bearings for maintaining said shaft in position, means for driving said shaft, an elongated shaft extending across the case and through an opening in said case in line with said short shaft, and a driving connection between the ends of said shafts permitting slight relative movement in any direction.

In testimony whereof I affix my signature in presence of two witnesses.

RUSSELL HUFF.

Witnesses:
W. H. FINCKEL, Jr.,
RICHARD E. MANTON.